United States Patent [19]

Summers

[11] Patent Number: 5,889,138
[45] Date of Patent: Mar. 30, 1999

[54] PROCESS FOR MAKING STAIN RESISTANT NYLON FIBERS FROM HIGHLY SULFONATED NYLON COPOLYMERS

[75] Inventor: Arthur W. Summers, Pensacola, Fla.

[73] Assignee: Solutia Inc., St. Louis, Mo.

[21] Appl. No.: 785,757

[22] Filed: Jan. 17, 1997

Related U.S. Application Data

[63] Continuation-in-part of Ser. No. 757,216, Nov. 27, 1996, abandoned.

[51] Int. Cl.$^6$ .............................. C08G 69/08; C08G 43/10
[52] U.S. Cl. ........................... 528/310; 528/313; 528/322; 528/323; 528/332; 528/335; 528/336; 528/337; 528/345; 264/75; 264/176.1; 264/184
[58] Field of Search ................................... 528/313, 310, 528/322, 335, 323, 336, 337, 332, 345; 264/75, 176.1, 184

[56] References Cited

U.S. PATENT DOCUMENTS

| | | | |
|---|---|---|---|
| 3,142,662 | 7/1964 | Huffman | 260/78 |
| 3,184,436 | 5/1965 | Magat | 260/78 |
| 3,389,549 | 6/1968 | David | 57/140 |
| 3,542,743 | 11/1970 | Flamand | 260/78 |
| 3,640,942 | 2/1972 | Crampsey et al. | 260/37 |
| 3,846,507 | 11/1974 | Thomm et al. | 260/857 |
| 3,849,377 | 11/1974 | Boehmke | 260/49 |
| 4,374,641 | 2/1983 | Burlone | 8/557 |
| 4,579,762 | 4/1986 | Ucci | 428/95 |
| 5,108,684 | 4/1992 | Anton et al. | 264/176 |
| 5,340,886 | 8/1994 | Hoyt et al. | 525/426 |
| 5,401,554 | 3/1995 | Armen | 428/96 |
| 5,436,049 | 7/1995 | Hu | 428/85 |
| 5,545,363 | 8/1996 | Hoyt et al. | 264/78 |
| 5,548,037 | 8/1996 | Hoyt et al. | 525/426 |
| 5,560,973 | 10/1996 | Hoyt et al. | 428/97 |
| 5,562,871 | 10/1996 | Hoyt et al. | 264/130 |

FOREIGN PATENT DOCUMENTS

| | | | |
|---|---|---|---|
| WO97/07962 | 3/1997 | WIPO | B29C 47/00 |

*Primary Examiner*—P. Hampton-Hightower
*Attorney, Agent, or Firm*—Arnold, White & Durkee

[57] ABSTRACT

A process for making stain resistant nylon fibers from a mixture of nylon and highly sulfonated nylon copolymer is disclosed. The highly sulfonated nylon has greater than about 4.0% weight of aromatic sulfonate incorporated into the polymer structure and an unexpectedly low solid particle content as measured by Flow Vision Particle Analyzer and melt filtration studies. Also disclosed is the process and composition of the highly sulfonated nylon copolymer.

30 Claims, 1 Drawing Sheet

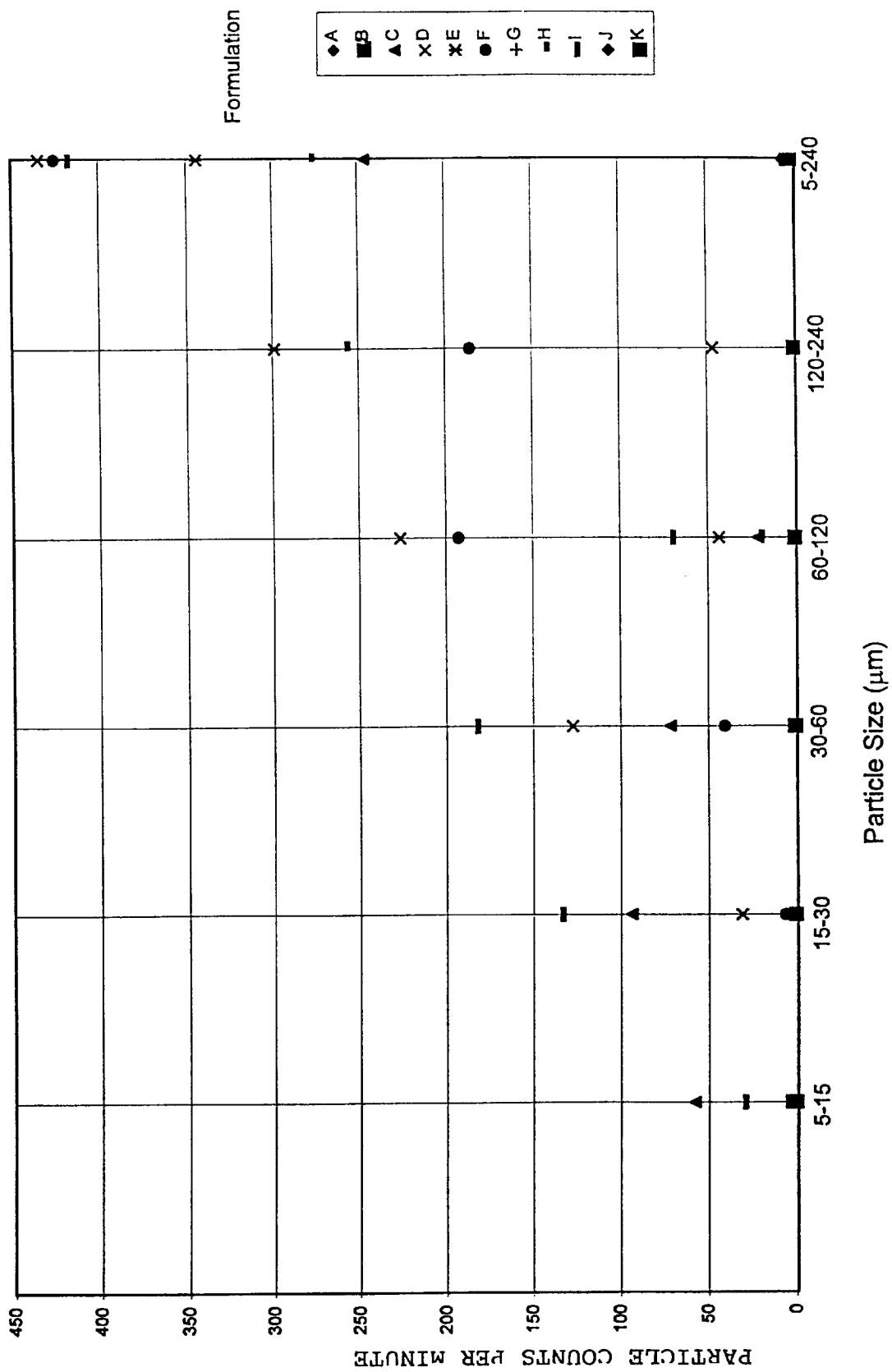

PROCESS FOR MAKING STAIN RESISTANT NYLON FIBERS FROM HIGHLY SULFONATED NYLON COPOLYMERS

This application is a continuation-in-part of Ser. No. 08/757,216, filed on Nov. 27, 1996 now abandoned.

BACKGROUND OF THE INVENTION

1. Field of the Invention

The present invention is generally directed to a process of making stain resistant nylon fibers, and the process of making and the composition of a highly sulfonated nylon copolymer used in the making of the stain resistant nylon fibers.

2. Background

Nylon fiber is widely used in the manufacture of carpets and other textile materials. For aesthetic and utilitarian purposes, nylon fiber may be colored using a variety of techniques. One method is to dye the fiber using acid dyes which are typically synthetic and natural anionic dyes with relatively low molecular weights that carry from one to three sulfonic acid groups. Acid dyes are known to ionically bond to the terminal amino, imido and other positively charged site in the nylon polymer.

Another way to color nylon fiber is to include a pigment in the polymer melt from which the nylon fiber is spun. By using pigments to impart color to the nylon fiber, a permanent and more uniform coloration of the fiber may be achieved. Unfortunately, pigmented nylon fiber can be unintentionally "dyed", that is to say stained, by natural or artificial acid dyes existing in some foods and drinks when they are spilled onto nylon carpets and other textile materials.

A common solution to this problem is to topically apply to the surface of the pigmented nylon fiber a material that will function as a "stain-blocking" agent. Although very effective in the short term, such treatments wear off long before the end of the useful life of the carpet or textile material. Further, such treatment may be accidentally removed by detergents or other cleaning agents that may be used on the carpet or other textile material.

Alternatively, it is known that small amounts of certain materials that impart cationic dyeability to nylon, such as aromatic sulfonates and their alkali metal salts, can be copolymerized with the nylon as a means of rendering the nylon resistant to staining by synthetic and natural acid dyes. For example in U.S. Pat. No. 5,108,684 a method of making an acid dye resistant, pigmented nylon fiber is disclosed. The stain resistant nylon fiber is made from a sulfonated nylon polymer containing up to 4% aromatic sulfonate. The sulfonated polymer is made by the inclusion of up to 4% aromatic sulfonate or alkali metal salts in the nylon polymerization reaction. Specifically the sodium salt of 5-sulfoisophthalic acid is taught as being useful. Further improvements on this technology are disclosed in a number of U.S. patents in which the above fiber is treated with various chemical agents after being spun to further enhance the stain resistance of the fiber. One disadvantage of this technology is that in order to "custom formulate" the level of sulfonation, a custom batch of polymer must be formulated to meet the desired sulfonation level.

Another approach to achieving stain resistant nylon fiber is to melt blend regular nylon with a sulfonated nylon polymer that has sulfonated aromatic groups as part of the polymer structure. U.S. Pat. No. 3,846,507 teaches that a highly sulfonated random terpolymer, made by the polymerization reaction of isophthalic or terphthalic acid, a salt of an aromatic sulfonate, and hexamethylene diamine, may be blended with regular nylon to give a smooth acid dye resistant fiber. Particularly, the sulfonated nylon terpolymer resulting from the polymerization of a mixture of isophthalic acid, the sodium salt of 5-sulfoisophthalic acid and hexamethylene diamine is taught as being useful. It is taught that the inclusion of the isophthalic or terphthalic acid is critical if the sulfonated nylon polymer is to be useful in the melt blending and spinning of commercially useful fibers. When the isophthalic or terphthalic acid is not included in the formulation of the highly sulfonated nylon polymer, the resulting blended nylon gives a fiber that is beady and uneven. It is well known in the art that fibers that are beady and uneven have poor appearance and break easily and therefore cannot be used in the formation of carpets or other textile materials.

SUMMARY OF THE INVENTION

One aspect of the present invention is generally directed to a process for making stain resistant nylon fibers including melt blending a mixture of a nylon polymer with a highly sulfonated nylon, copolymer and spinning the polymer mixture into stain resistant nylon fibers. The highly sulfonated nylon copolymer contains greater than 4.0 weight percent of an aromatic sulfonate or alkali metal salt thereof and should have a low solid particle content. In one embodiment, the highly sulfonated nylon copolymer has a total Flow Vision Particle Analyzer count of less than 200 particle counts per minute for particles having a size from about 5 $\mu$m ($5 \times 10^{-6}$ m) to 250 $\mu$m ($2.5 \times 10^{-4}$ m) and in another embodiment the highly sulfonated nylon copolymer has a melt filtration pressure increase value of no greater than 2000 PSI/Hr.

A second aspect of the present invention is generally directed to a process for the synthesis of the highly sulfonated nylon copolymer used in the above described process. In one embodiment the highly sulfonated nylon copolymer is the polymeric reaction product of a mixture including a nylon monomer or combinations thereof, an alkali metal salt of an aromatic sulfonate and a diamine. The nylon monomer may be any suitable nylon raw material such as ε-caprolactam (nylon 6) or a combination of monomers such as nylon 6/6 salt (hexamethylene diamine and adipic acid). The diamine may be either an alkyl or aromatic diamine and preferably is hexamethylene diamine. The alkali metal salt is preferably a sodium or lithium salt of 5-sulfoisophthalic acid and more preferably a lithium salt of 5-sulfoisophthalic acid. The polymerization reaction is carried out under conventional nylon polymerization conditions.

A third aspect of the present invention is the composition of the highly sulfonated nylon copolymer resulting from the above noted process. The copolymer has a low solid particle content and has a sulfur level of at least 5,500 parts of sulfur per million parts of nylon copolymer. In one embodiment, the highly sulfonated nylon copolymer of the present invention has a Flow Vision Particle Analyzer count of less than about 200 particle counts per minute and in another embodiment has a melt filtration pressure increase value of no greater than 2000 PSI/Hr.

A fourth aspect of the present invention is generally directed to a process of making a pigmented stain resistant nylon fiber including the melt blending of a mixture of nylon 6/6, a highly sulfonated nylon copolymer and a pigment and spinning the mixture into a pigmented stain resistant nylon fiber.

BRIEF DESCRIPTION OF THE DRAWINGS

These and other features of the present invention are more fully set forth in the following description of illustrative embodiments of the invention. The description is presented with reference to the accompanying drawings in which:

FIG. 1 is a graphical representation of the Flow Vision Particle Analyzer data presented in Table 2.

DESCRIPTION OF ILLUSTRATIVE EMBODIMENTS

The following terms and phrases are used herein and are intended to have the following meaning "nylon fiber" is any continuous filament or staple form of a polyamide polymer, commonly called nylon, which may be spun, knitted, woven, pressed, tufted or otherwise formed in the manufacturing of carpets or other textile materials;

"textile material" is any spun, knitted, woven, pressed, non-woven, or otherwise formed material made from natural or synthetic fibers or mixtures or blend thereof, including yarn, string, thread, fabric, cloth, drapery material, velour, velvet, velveteen, corduroy, rugs, carpet and the like;

All percents are values of weight percent unless specified otherwise.

One aspect of the present invention is generally directed to a process for making a stain resistant nylon fiber. The process includes melt blending a mixture of polymers, the mixture including a nylon polymer and a highly sulfonated nylon copolymer, and spinning the melted polymer mixture into a stain resistant fiber. Suitable nylon polymers include all know synthetic polyamide polymers, including those selected from the group of nylon 6, nylon 6/6, nylon 6/9, nylon 6/10, nylon 6T, nylon 6/12, nylon 11, nylon 12 and copolymers and mixtures thereof. In one embodiment, the nylon polymer is selected from the group including nylon 6 (poly-$\epsilon$-caprolactam), nylon 6/6 (polyhexamethylene adipamide), and mixtures thereof. In another embodiment the nylon polymer is polyhexamethylene adipamide (nylon 6/6). One of ordinary skill in the art should know how to make or commercially obtain these nylon polymers which are commercially available from numerous sources including Monsanto, Co. of St. Louis, Mo.

The highly sulfonated nylon copolymer used in the above process is the polymeric reaction product of a process that is disclosed in greater detail below. The highly sulfonated nylon copolymers of the present invention are formulated so as to have what is considered in the art a "high" level of sulfonation. As the term is used in this disclosure, a highly sulfonated nylon copolymer may be a polyamide polymer having greater than about 4.0% weight of an aromatic sulfonate or the alkali metal salt thereof incorporated into the polymer structure. Alternatively, a highly sulfonated nylon copolymer of the present invention may be a polyamide polymer having a sulfur level of at least about 5,500 parts of sulfur per million parts of polymer. Such "high" levels of sulfonation are needed so that upon melt blending with regular nylon polymer, the resulting nylon fiber is stain resistant. In one embodiment, the highly sulfonated nylon copolymer of the present invention contains greater than 4.0% weight of an aromatic sulfonate or alkali metal salt thereof. In another embodiment, the amount of aromatic sulfonate or alkali metal salt thereof in the highly sulfonate nylon copolymer is from about 5.0% to about 10.0% weight. In yet a third embodiment the highly sulfonated nylon copolymer has a sulfur level of at least about 5,500 parts sulfur per million parts nylon copolymer. For a fourth embodiment of the invention, a highly sulfonated nylon copolymer has a sulfur level from about 6,800 to about 14,600 parts sulfuir per million parts nylon copolymer.

The melt blending of the mixture of polymers in the process of the present invention for making a stain resistant nylon fiber may be carried out in a conventional melt extruder at a temperature from about 220° C. (428° F.) to about 400° C. (752° F.). The exact temperature for any one formulation will vary in accordance with the melting point of the solid mixture of polymer pellets, chips or flakes. The amount of highly sulfonated copolymer and the amount of regular nylon used to make the polymer melt should be in proportions so as to achieve a stain resistant nylon fiber. In one embodiment, the amount of highly sulfonated nylon copolymer is from about 10% to about 35% weight of the polymer mixture. In another embodiment the amount of highly sulfonated nylon copolymer used in the polymer mixture results in a nylon fiber having a sulfur level of at least 2,300 parts of sulfur per million parts of nylon polymer which corresponds roughly to about 2% weight aromatic sulfonate in the nylon fiber. It is well known in the nylon fiber art that nylon fibers having these values exhibits useful acid dye stain resistance.

An advantage of the present invention is that it allows for the formulation of nylon fibers that have a level of stain resistance that is most suitable for the application. For example, a nylon fiber that is light in color needs a much higher level of stain resistance than one that is darkly colored. In other cases, a nylon fiber that is to be use in making carpets for high traffic areas, such as hotel lobbies or airports, will need a much higher level of stain resistance than a fiber used to make drapery materials. One of ordinary skill in the art should readily appreciate the advantages of the present process in that it allows one to simply and readily "custom formulate" the level of stain resistance of the nylon fiber using conventional fiber forming processes and equipment. This is in contrast to the conventional method of having to produce special batches of sulfonated nylon polymer with varying levels of aromatic sulfonate for each application.

The homogeneous polymer melt is spun through conventional spinnerets into nylon fibers which are conventionally gathered and processed into textile materials. In one embodiment in which the nylon fibers are to be used in the manufacture of yarn for carpets, the denier of the individual nylon fiber, here referred to as a filament, may be from about 5 to about 30 drawn denier per filament. One of skill in the art should know that drawn denier is a measurement of the "thickness" of the nylon fiber and which is determined by the weight in grams of a single filament with a length of 9000 meters.

If a pigmented stain resistant nylon fiber is desired, as opposed to a natural fiber in which there are no pigments, the addition of a wide range of both organic and inorganic pigments may be further included in the above described process of making a stain resistant nylon fiber. The pigments are generally introduced in a conventional manner in the form of a concentrate formulation containing one or more "pure" pigments. The number, color and proportions of the "pure" pigments will be based on the shade of color desired in the nylon fiber. Other factors that may affect the color of the nylon fiber include the presence of lubricant additives, extenders, fillers, flame retardants, UV-light stabilizers, antioxidants, antistatic agents, antimicrobial agents, nucleating agents and so forth. The affect of these factors on color and the fiber spinning process should be appreciated and understood by one of ordinary skill in the art.

Another aspect of the present invention is the process of making the highly sulfonated nylon copolymer utilized in the process of making the stain resistant nylon fiber. As previously noted above, a highly sulfonated nylon copolymer may be a polyamide polymer having greater than about 4.0% weight of an aromatic sulfonate or the alkali metal salt thereof. Alternatively, a highly sulfonated nylon copolymer of the present invention may be a polyamide polymer having a sulfur level of at least about 5,500 parts of sulfur per million parts of polymer. Thus in one embodiment, a highly sulfonated nylon copolymer of the present invention contains greater than about 4.0% weight of an aromatic sulfonate or alkali metal salt thereof. In another embodiment, the amount of aromatic sulfonate or alkali metal salt thereof in the highly sulfonate nylon copolymer is from about 5.0% to about 10.0% weight. In yet a third embodiment a highly sulfonate nylon copolymer has a sulfur level of at least about 5,500 parts sulfur per million parts nylon copolymer. And for a fourth embodiment of the invention, the highly sulfonated nylon copolymers have a sulfur level from about 6,800 to about 14,600 parts sulfur per million parts nylon copolymer.

One of the primary problems encountered in formulating the highly sulfonated nylon copolymers of the present invention is the formation of solid particles in the polymer. Typically these particles have a size from about 5 $\mu$m ($5\times10^{-6}$ m) to about 250 $\mu$m ($2.5\times10^{-4}$ m) in diameter. While particles of such size are not of great concern during the melt blending of the polymer mixture, one of ordinary skill in the art will appreciate the effect of such solids in the spinning process and quality of the resulting nylon fiber. It should be well known to one skilled in the art that the presence of solids in the nylon fiber adversely affects not only the tensile and shear strengths of the fiber, but the solid particles also impart undesirable nubbs which give the fiber a beady and uneven appearance. Further, the presence of solids of greater than about 200 $\mu$m ($2.0\times10^{-4}$ m) tend to rapidly clog the spinning pack used in the making of the nylon fiber. These problems should be well known to one of ordinary skill in the art as is recognized in numerous references including U.S. Pat. No. 3,846,507. As is taught by this reference, the solution to the formation of solids in highly sulfonated nylon copolymers is the inclusion of unsulfonated isophthalic or terphthalic acid in polymerization reaction mixture. The inclusion of the isophthalic or terphthalic acid only partially solves the problem, as will be shown below. The source of and the reason for the formation of the solid particles was previously unknown.

It has been unexpectedly and surprisingly found that the use of sodium aromatic sulfonate salts in the copolymerization reaction, as is taught by and preferred in the prior art, is the primary source of the solid particles in highly sulfonated nylon copolymers. Further, it has also been found that as the amount of sodium aromatic sulfonate salt used in the formulation of the highly sulfonated nylon copolymer increases, the size and presence of the solid particles increases. These unexpected and previously unrecognized affects of the use of sodium salts on the source, size and amount of solid particles found in highly sulfonated nylon copolymer are supported by the following observations.

One manner of determining the solid particle content of a polymer is the use of a Flow Vision Particle Analyzer to count the particles present in the molten polymer. A study of the solid particle content of several sulfonated nylon copolymers was conducted using a Flow Vision Particle Analyzer model PED-2 available from Kayeness, Inc. of Charlotte, N.C. The range of particles counted was from about 5 $\mu$m ($5\times10^{-6}$ m) to about 250 $\mu$m ($2.5\times10^{-4}$ m) in size, using visible light, a polymer temperature of about 290° C. and the average velocity in Flow Vision die of about 16 inches per minute. The particle content of a number of sulfonated copolymer formulations having the approximate compositions shown below in Table 1 were measured. The following abbreviations are used below for the following chemical compounds: sodium salt of 5-sulfoisophthalic acid (5-SSIPA)); lithium salt of 5-sulfoisophthalic acid (5-LSIPA)); and, isophthalic acid (IPA).

TABLE 1

| Formulation | 5-SSIPA (% weight) | 5-LSIPA (% weight) | IPA:5-SSIPA (w/w ratio) |
| --- | --- | --- | --- |
| A | 1.7 | 0 | n/a |
| B | 1.7 | 0 | n/a |
| C | 4.4 | 0 | n/a |
| D | 5.1 | 0 | n/a |
| E | 5.4 | 0 | n/a |
| F | 6.2 | 0 | n/a |
| G | 6.0 | 0 | 1:1 |
| H | 3.4 | 3.4 | n/a |
| I | 5.0 | 1.7 | n/a |
| J | 0 | 6.6 | n/a |
| K | 0 | 6.6 | n/a |

One of ordinary skill in the art will note from the above formulations, that formulations A and B have conventional amounts of 5-SSIPA, while formulation C has the maximum amount of 5-SSIPA as taught in U.S. Pat. No. 5,108,684. Formulations D, E and F all have what are considered high levels of sulfonation as imparted by the sodium salt of 5-sulfoisophthalic acid. Formulation G is a terpolymer formulated so as to include isophthalic acid in the polymerization reaction mixture. While formulations H and I contain mixtures of the sodium and lithium salts of 5-sulfoisophthalic acid. Lastly formulations J and K use 5-LSIPA to achieve high levels of aromatic sulfonation in the polymer structure.

The count of particles per minute having a size from about 5 $\mu$m ($5\times10^{-6}$ m) to about 250 $\mu$m ($2.5\times10^{-4}$ m) and the total count of particles per minute in the specified ranges for each of the above formulations are given below in Table 2 and are graphically shown in FIG. 1.

TABLE 2

| | Solid Particle Size ($\mu$m) | | | | | |
| --- | --- | --- | --- | --- | --- | --- |
| Formulation | 5–15 | 15–30 | 30–60 | 60–120 | 120–240 | Total |
| A | 2.1 | 1.2 | 0.7 | 0.2 | 0 | 4.2 |
| B | 2.3 | 0.5 | 0.3 | 0.3 | 0.2 | 3.6 |
| C | 58 | 94 | 72 | 21 | 1 | 246 |
| D | 3.1 | 31.0 | 127.1 | 226.6 | 46.7 | 434.5 |
| E | 0 | 0.1 | 1.4 | 43.6 | 299.0 | 344.1 |
| F | 0.6 | 6.0 | 40.5 | 192.6 | 185.5 | 425.2 |
| G | 40.6 | 134.0 | 132.6 | 88.5 | 10.9 | 406.6 |
| H | 0 | 0 | .5 | 19 | 256 | 276 |
| I | 29 | 133 | 182 | 70 | 3 | 417 |
| J | 2 | 2.2 | 1.6 | 0.4 | 0.1 | 6.3 |
| K | 0.5 | 0.6 | 0.4 | 0.4 | 0.1 | 2.0 |

Conventional accelerated melt filtration studies were also conducted on a selection of the above copolymers. One of ordinary skill in the art should know that by measuring the increase in the melt filtration pressure, the level of undesirable solid particles in a nylon polymer can be determined. Further such a person should appreciate that when using a melt filtration screen of 5 $\mu$m ($5\times10^{-6}$ m) and a melt flow rate of 17 pounds per hour per square inch of filter area, that a nylon polymer having a melt filtration pressure increase of less that 1000 PSI/Hr indicates that the nylon polymer contains few undesirable solid particles. In a typical melt filtration measurement the pure copolymer was melted in an extruder and a portion of the melt was passed through a heated block to a filtration pack in which the finest screen was as noted below in Table 3. The increase in the pressure across the filtration pack was measured for one hour, except as noted, and the values are given below in Table 3.

TABLE 3

| Formulation | Melt Filter Screen ($\times 10^{-6}$ m) | Melt Filtration Pressure Increase (PSI/Hr) |
|---|---|---|
| A | 5 | 563 |
| B | 5 | 641 |
| D | 5 | >3500 in less than 1 min. |
| E | 40 | 3632 |
| F | 5 | >3500 in less than 1 min. |
| J | 5 | 640 |
| K | 5 | 450 |

Upon consideration of the above experimental observations, the following trends were unexpectedly discovered: (1) as the amount of sodium 5-sulfoisophthalic acid increases both the size and the total count of solid particles in the copolymer increases; (2) the addition of isophthlaic acid to the copolymerization reaction mixture decreases the size but does not eliminate the presence of solid particles in the copolymer; and (3) the substitution of lithium 5-sulfoisophthalic acid for sodium 5-sulfoisophthalic acid decreases both the size and number of the solid particles in the copolymer. Therefore in one embodiment, the alkali metal of the aromatic sulfonate salt used in the formulation of the highly sulfonated nylon copolymers is preferably lithium and in another embodiment, a mixture of alkali metal salts may be used, the mixture including a majority of lithium salts.

In view of the above unexpectedly observed trends, one of ordinary skill in the art should appreciate that the substitution of lithium salts for sodium salts in the copolymerization reaction mixture results in a highly sulfonated nylon copolymer having unexpectedly small solid particles and unexpectedly low solid particle content. Further, the substitution of lithium salts for sodium salts allows for the formulation of highly sulfonated nylon copolymers that have very low melt filtration pressure increase. Therefore, in one embodiment of the highly sulfonated nylon copolymers of the present invention, the copolymers have a total Flow Vision Particle Analyzer particle count less than about 200 particle counts per minute. In another embodiment, the highly sulfonated nylon copolymers of the present invention have a melt filtration pressure increase of no greater than about 2000 PSI/Hr.

At about the same time as the above experimental observation, it was determined by x-ray spectroscopy that the solid particles of the highly sulfonated nylon copolymers formulated using sodium 5-sulfoisophthalic acid, contained unexpectedly high levels of both sodium and sulfur. While not intending to be limited to any particular theory as to the exact chemical nature of the solid particles, it is believed that the solid particles are some form of the unreacted sodium 5-sulfoisophthalic acid which form during the nylon polymerization reaction. This speculative theory is further supported in view of the above noted observations of the effects of substituting sodium salts with lithium salts on the particle size and content of highly sulfonated nylon polymers.

Regardless of the actual chemical reason for the formation of, or the chemical nature of the solid particles in highly sulfonated nylon copolymers, one facet of the present invention is the unexpected discovery that both the size and the number of the solid particles in a highly sulfonated nylon copolymer can be controlled by the selection of the cation of the aromatic sulfonate. As noted above, prior to the discovery of the unexpected observations reported above, it was believed that the only known manner of formulating a highly sulfonated nylon polymer was by the inclusion of unsulfonated phthalic acids in the nylon polymerization reaction mixture thus giving a terpolymer. However as is shown above while the inclusion of isophthalic acid in the polymerization reaction mixture give a sulfonated terpolymer that may be useful, it does not exhibit the low particle content that characterizes the highly sulfonated nylon copolymers made by the process of the present invention.

The process for making the highly sulfonated nylon copolymers of the present invention mixture includes the polymerization of a mixture including a nylon monomer or mixtures thereof, an aromatic sulfonate or an alkali metal salt thereof and a diamine.

The nylon monomer may be any suitable diamine, dicarboxylic acid, diester, cyclic amide or mixtures thereof which may serve as the raw material for the formation of a polyamide. In one embodiment, the nylon monomer may be $\epsilon$-caprolactam (2-oxohexamethyleneimine) which is the monomer that forms nylon 6. One of ordinary skill in the art should understand and appreciate that often mixtures of nylon raw materials, typically referred to as nylon salts, are used as a raw material for the formation of polyamides. Nylon salts are made by reacting an alkyl or aromatic dicarboxylic acid, such as isophthalic acid, terphthalic acid, adipic acid, or sebacic acid, with an alkyl or aromatic diamine, such as hexamethylene diamine or 1,4-bisaminomethylcyclohexane. A mixture of nylon monomers, in the form of a nylon salt, may be used in the practice of the process of the present invention. In one such embodiment a nylon 6/6 salt which is a mixture of hexamethylene diamine (1,6-hexanediamine) and adipic acid (hexanedioic acid) is utilized.

The diamine of the above process may be selected from the group including $C_6$–$C_{12}$ alkyl and aromatic diamines that are capable of copolymerizing with polyamide forming raw materials. It is preferred that the diamine be selected from the group including $C_6$–$C_{12}$ aliphatic alkyl diamines and preferably the diamine should be hexamethylene diamine.

Suitable aromatic sulfonates and their alkali metal salts are those which are capable of copolymerizing with polyamide forming raw materials. Examples of such compounds include sulfonated dicarboxylic acids and the diesters of such diacids. In one embodiment the alkali metal salt may be of 5-sulfoisophthalic acid or 5-sulfoterphthalic acid. In another embodiment the aromatic sulfonate may be an alkali metal salt of 5-sulfoisophthalic acid. As previously noted, the cation of the alkali metal salt of the aromatic sulfonate has an unexpected affect on the solid particle content and particle size of the highly sulfonated nylon copolymer. Thus in one embodiment, the alkali metal of the aromatic sulfonate salt is lithium. In another embodiment, a mixture of alkali metal salts may be used, the mixture including a majority of lithium salts.

The reaction mixture used to make highly sulfonated nylon polymer according to the present invention includes a nylon monomer or mixtures thereof, an aromatic sulfonate or a alkali metal salt thereof and a diamine. In one embodiment a mixture of nylon 6 monomer, lithium 5-sulfoisophthalic acid and hexamethylene diamine will be suitable. In another embodiment a mixture of nylon 6/6 salt, lithium 5-sulfoisophthalic acid and hexamethylene diamine was used. One of ordinary skill in the art of formulating nylon polymers will understand that the exact amount of each component will vary depending on the formulation of the desired copolymer. Further it should be understood by such a person that as the amount of alkali metal salt of aromatic sulfonate increases the level of sulfonation in the nylon polymer will increase. For the embodiment in which a mixture of nylon 6 monomer, lithium 5-sulfoisophthalic acid and methylene diamine is to be used the molar ratio of lithium salt to methylene diamine will be about 1:1 and the amount of nylon 6 monomer will depend upon the level of sulfonation desired. In the embodiment in which both a nylon 6/6 salt and an equal molar salt of lithium 5-sulfoisophthalic acid and hexamethylene diamine were used, the weight ratio of the two salts may be from about 12.7:1 to about 5.8:1.

The conditions, such as temperature, pressure, and duration of the polymerization reaction that results in the highly sulfonated nylon copolymer of the present invention are conventional and well known in the art. Reference is made to the following documents, the contents of which are hereby incorporated herein by reference and to which the reader is referred for a more thorough discussion of conditions and techniques for conducting batch nylon polymerization reaction: D. C. Jones & T. R. White, Chapter 2 Polyamides in *Step-Growth Polymerization,* 41,46–49 (D. H. Solomon, ed., 1972) and references therein including U.S. Pat. Nos. 2,071,250; 2,130,523; 2,130,947; and 2,130, 948. In one embodiment, the reaction melt temperature prior to the removal of pressure from the reaction vessel should be greater than about 250° C. to prevent the formation of excessive polymer foam. As is conventional in the art, upon completion of the polymerization reaction, the resulting highly sulfonated nylon copolymer is removed from the reaction vessel and conventionally formed into chips, pellets, flakes and the like for storage and use later.

A third aspect of the present invention is the highly sulfonated nylon copolymer resulting from the above disclosed process. One especially useful highly sulfonated nylon copolymer has the general formula

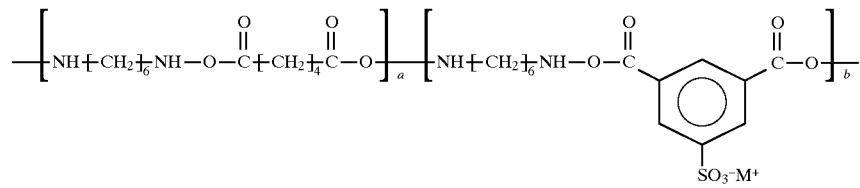

in which $M^+$ is an alkali metal and the numeric ratio of a:b may be from about 18:1 to about 8:1. The alkali metal is preferably either sodium or lithium and more preferably lithium. The synthesis of the above polymer is carried out using the process previously disclosed above in which the reaction mixture preferably includes a nylon 6,6 salt, a lithium salt of 5-sulfoisophthalic acid and hexamethylene diamine.

One characteristic of the above highly sulfonated nylon copolymer is that it has a low solid particle content when compared to previously known sulfonated nylon copolymers. In one embodiment, the above highly sulfonated nylon copolymer has a Flow Vision Particle Analyzer count of less than 200 particle counts per minute. In another embodiment of the above highly sulfonated nylon copolymer, the copolymer has a melt filtration pressure increase of no greater than about 2000 PSI/Hr.

Another characteristic of the highly sulfonated nylon copolymer shown above is that it contains a "high" number of aromatic sulfonate groups as part of the polymer structure. One way of determining the number of aromatic sulfonate groups is to measure the sulfur level in the polymer. One of ordinary skill in the art should know and appreciate the methods and techniques that can be used to determine the sulfur level of a polymer. In one embodiment of the above copolymer composition, the sulfur level is at least 5,500 parts sulfur per million parts nylon copolymer. In another embodiment, the sulfur level is from about 6,800 to about 14,600 part of sulfur per million parts of nylon copolymer.

The following examples are included to demonstrate preferred embodiments of the invention. It should be appreciated by those of ordinary skill in the art that the techniques disclosed in the examples which follow represent techniques discovered by the inventors to function well in the practice of the invention, and thus can be considered to constitute preferred modes for its practice. However, those of ordinary skill in the art should, in light of the present disclosure, appreciate that many changes can be made in the specific embodiments which are disclosed and still obtain a like or similar result without departing from the spirit and scope of the invention.

EXAMPLE 1

A highly sulfonated nylon copolymer was made by mixing a nylon 6/6 salt, and a 1:1 molar salt made by mixing lithium 5-sulfoisophthalic acid and hexamethylene diamine, in a dry salt weight ratio of about 9:1 and polymerizing the mixture of salts. The copolymer formed had a Flow Vision Particle Analyzer count of about 25 and a melt filtration pressure increase of about 408 PSI/Hr. The sulfur level of the copolymer was about 9,791 ppm which indicates that the lithium 5-sulfoisophthalic monomer constituted about 6.6% weight of the polymer. The resulting copolymer was conventionally processed into polymer flakes.

The spinning of stain resistant nylon fiber was carried out using conventional extrusion nylon fiber spinning techniques to give a natural nylon fiber having a drawn denier of about 21. The ratio of nylon 6/6 to highly sulfonated nylon copolymer was between 22% and 28% by weight of the polymer melt.

The nylon fiber was gathered and conventionally processed into a direct tufted Level Loop nylon carpet. The natural fiber carpet was subjected to a conventional Adult Staining Series test in which the carpet was stained with the noted stain and cleaned with an appropriate cleaning agent after 18 hours. The color of the stained carpet was compared with an unstained control sample and given a number on a scale of 1 (poor stain resistance) to 10 (full stain resistance). The results of one such test are given below in Table 4 in which the nylon blend of the present invention is compared to a stain resistant nylon carpet made of a nylon polymer containing 2% sodium 5-sulfoisophthalic acid.

TABLE 4

| | Nylon Carpet Fiber Type | |
| --- | --- | --- |
| | Blend | Control |
| ppm S as SO$_3^-$ | 2,422 | 2,325 |
| Staining Agent: | | |
| Coffee w/ Cream & Sugar | 7.5 | 7 |
| Dark Cola | 9.5 | 9.5 |
| Spaghetti Sauce | 9 | 9 |
| Cranberry/Strawberry | 9 | 9 |
| Lipstick | 10 | 10 |
| Red Dye 40 | 9 | 9.5 |
| 100% Bleach | 10 | 10 |

One of ordinary skill in the art should realize given the above information that the stain resistance of the fiber made from a blend of nylon 6/6 and the highly sulfonate nylon copolymer of the present invention and a nylon fiber made from a nylon copolymer containing 2% sodium 5-sulfoisophthalic acid are comparable.

EXAMPLE 2

A highly sulfonated nylon copolymer was made by mixing a nylon 6/6 salt, and a 1:1 molar salt made by mixing lithium 5-sulfoisophthalic acid and hexamethylene diamine, in a weight ratio of about 9:1 and polymerizing the mixture of salts. The copolymer formed had a Flow Vision Particle Analyzer count of about 25 and a melt filtration pressure increase of about 408 PSI/Hr. The sulfur level of the copolymer was about 9,791 which indicates that the lithium 5-sulfoisophthalic monomer constituted about 6.6% by weight of the polymer. The resulting copolymer was conventionally processed into polymer flakes.

The spinning of stain resistant nylon fiber was carried out using conventional extrusion nylon fiber spinning techniques to give a white nylon yarn having a yarn denier of about 3,000. The ratio of nylon 6/6 to highly sulfonated nylon copolymer was between 22% and 28% by weight of the polymer melt which also contained a ceiling white pigment concentrate.

The nylon yarn was gathered and conventionally processed into by direct tufted Level Loop nylon carpet. The pigmented fiber carpet was subjected to an Acid Red Dye 40 staining test in which the carpet was stained with Acid Red Dye 40. The stained carpet sample was washed after 18 hours. The color of the stained carpet before and after washing was compared with an unstained control sample and given a number on a scale of 1 (poor stain resistance) to 10 (full stain resistance). The results of one such test are given below in Table 5 in which the nylon blend of the present invention is compared to a stain resistant nylon carpet made of a nylon polymer containing 2% sodium 5-sulfoisophthalic acid.

TABLE 5

| | Nylon Carpet Fiber Type | |
| --- | --- | --- |
| | Blend | Control |
| ppm S as SO$_3^-$ | 2,371 | 2,300 |
| Staining Agent: | | |
| Red Dye 40 (as stained) | 7.5 | 8 |
| Red Dye 40 (after washing) | 9.5 | 10 |

One of ordinary skill in the art should realize given the above information that the stain resistance of the fiber made from a blend of nylon 6/6, the highly sulfonate nylon copolymer of the present invention and ceiling white pigment, and a nylon fiber made from a nylon copolymer containing 2% sodium 5-sulfoisophthalic acid are comparable.

While the compositions and methods of this invention have been described in terms of preferred embodiments, it will be apparent to those of ordinary skill in the art that variations may be applied to the process described herein without departing from the concept, spirit and scope of the invention. All such substitutions and modifications apparent to those skilled in the art are deemed to be within the spirit, scope and concept of the invention as it is set out in the following claims.

What is claimed is:

1. A process for making stain resistant nylon fibers comprising, melt blending a mixture of polymers, the mixture comprising a nylon polymer and a sulfonated nylon copolymer, wherein the sulfonated nylon copolymer contains greater than about 4.0% weight of an aromatic sulfonate or an alkali metal salt thereof, and spinning the polymer mixture into stain resistant fibers.

2. The process of claim 1 wherein the alkali metal is lithium.

3. The process of claim 2 wherein the sulfonated nylon copolymer is the polymeric reaction product of a mixture consisting essentially of a nylon monomer or combinations thereof, a lithium salt of an aromatic sulfonate and a diamine.

4. The process of claim 1 wherein the sulfonated nylon copolymer has a low solid particle content.

5. The process of claim 4 wherein the sulfonated nylon copolymer has a total Flow Vision Particle Analyzer count of less than about 200 particle counts per minute.

6. The process of claim 4 wherein the sulfonated nylon copolymer has a melt filtration pressure increase value of no greater than about 2000 PSI/Hr.

7. The process of claim 2 wherein the sulfonated nylon copolymer comprises from about 5.0% weight to about 10.0% weight of an aromatic sulfonate or a lithium salt thereof.

8. The process of claim 2 wherein the sulfonated nylon copolymer has a sulfur level of at least about 5,500 parts of sulfur per million parts of copolymer.

9. The process of claim 3 further comprising adding a pigment to the melting mixture of polymers to impart color to the stain resistant fiber.

10. The process of claim 4 wherein the nylon polymer is nylon 6/6 and the amount of sulfonated nylon copolymer is from about 10 % to about 35% by weight of the polymer mixture.

11. A process for making a sulfonated nylon copolymer comprising polymerizing a reaction mixture including a nylon monomer or mixtures thereof, an aromatic sulfonate or an alkali metal salt thereof and a diamine under conditions so as to give the sulfonated nylon copolymer, wherein the sulfonated nylon copolymer contains greater than about 4.0% weight of an aromatic sulfonate or an alkali metal salt thereof.

12. The process of claim 11 wherein the alkali metal is lithium.

13. The process of claim 12 wherein the nylon monomer is a nylon 6/6 salt.

14. The process of claim 13 wherein the diamine is hexamethylene diamine.

15. The process of claim 11 wherein the sulfonated nylon copolymer has a low solid particle content.

16. The process of claim 15 wherein the sulfonated nylon copolymer has a Flow Vision Particle Analyzer count of less than about 200 particle counts per minute.

17. The process of claim 15 wherein the sulfonated nylon copolymer has a melt filtration pressure increase value of no greater than about 2000 PSI/Hr.

18. The process of claim 12 wherein the sulfonated nylon copolymer comprises from about 5.0% weight to about 10.0% weight of an aromatic sulfonate or a lithium salt thereof.

19. The process of claim 14 wherein the weight ratio of nylon 6/6 salt to the salt of the aromatic sulfonate and hexamethylenediamine is from about 12.7:1 to about 5.8:1.

20. The process of claim 19 further comprising maintaining the reaction melt temperature at a value of at least about 250° C. prior to reduction of the reaction vessel pressure.

21. A sulfonated nylon copolymer having the general formula

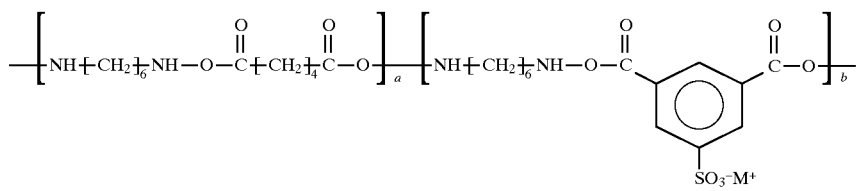

wherein $M^+$ is an alkali metal and the numeric ratio of a:b is from 18:1 to 8:1.

22. The sulfonated nylon copolymer of claim 21 wherein the alkali metal is lithium.

23. The sulfonated nylon copolymer of claim 21 wherein the sulfonated nylon copolymer has a low solid particle content.

24. The sulfonated nylon copolymer of claim 23 wherein the sulfonated nylon copolymer has a Flow Vision Particle Analyzer count of less than about 200 particle counts per minute.

25. The sulfonated nylon copolymer of claim 23 wherein the sulfonated nylon copolymer has a melt filtration pressure increase value of no greater than about 2000 PSI/Hr.

26. The sulfonated nylon copolymer of claim 21 wherein the sulfonated nylon copolymer has a sulfur level of at least about 5,500 parts sulfur per million parts nylon copolymer.

27. A process for making a colored stain resistant nylon fiber comprising melt blending a mixture of polymers and a pigment, the mixture of polymers comprising a nylon 6/6 polymer and a sulfonated nylon copolymer, wherein the sulfonated nylon copolymer contains greater than about 4.0% weight of an aromatic sulfonate or a lithium metal salt thereof and has a low solid particle content such that the sulfonated nylon copolymer has a Flow Vision Particle Analyzer count of less than about 200 particle counts per minute and a melt filtration pressure increase value no greater than about 2000 PSI/Hr, and spinning the melted mixture of polymers and pigment into the stain resistant fiber.

28. The process of claim 27 wherein the sulfonated nylon copolymer comprises from about 5% to about 10% by weight of an aromatic sulfonate or a lithium salt thereof.

29. The process of claim 28 wherein the sulfonated nylon copolymer in the polymer melt is from about 10% to about 35% by weight.

30. The process of claim 29 wherein the sulfonated nylon copolymer is the polymeric reaction product of the polymerization reaction of a mixture consisting essentially of a nylon 6/6 salt, a lithium salt of 5-sulfoisophthalic acid and hexamethylene diamine.

* * * * *